United States Patent
Miller et al.

(10) Patent No.: US 9,327,730 B2
(45) Date of Patent: May 3, 2016

(54) METHOD TO USE GPS TO OPTIMIZE STOPPING DISTANCE TO IMPROVE FUEL ECONOMY

(71) Applicant: Ford Global Technologies, LLC, Dearborn, MI (US)

(72) Inventors: Kenneth James Miller, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 14/181,977

(22) Filed: Feb. 17, 2014

(65) Prior Publication Data

US 2015/0232099 A1    Aug. 20, 2015

(51) Int. Cl.
  *B60W 30/18*    (2012.01)
  *B60T 7/12*    (2006.01)
  *B60W 10/18*    (2012.01)
  *B60T 7/18*    (2006.01)
  *F16H 61/00*    (2006.01)
  *F16H 59/18*    (2006.01)

(52) U.S. Cl.
  CPC ............ *B60W 30/18072* (2013.01); *B60T 7/12* (2013.01); *B60T 7/18* (2013.01); *B60W 10/18* (2013.01); *B60W 30/181* (2013.01); *B60L 2260/24* (2013.01); *B60W 2540/12* (2013.01); *B60W 2550/142* (2013.01); *F16H 2059/186* (2013.01); *F16H 2061/0015* (2013.01); *Y02T 10/48* (2013.01)

(58) Field of Classification Search
  CPC .................. B60W 30/18072; B60W 2540/12; B60W 2550/142; B60W 10/18; F16H 2059/186; F16H 2061/0015; Y02T 10/48; Y02T 10/56; B60L 2260/24
  USPC ......................................................... 701/70
  See application file for complete search history.

(56) References Cited

U.S. PATENT DOCUMENTS

| 8,116,971 | B2 | 2/2012 | Chen et al. |
| 8,145,376 | B2 | 3/2012 | Sherony |
| 8,187,149 | B2* | 5/2012 | Koenig ........................... 477/98 |
| 8,589,049 | B2 | 11/2013 | Craig |
| 8,731,788 | B2* | 5/2014 | Sujan et al. ..................... 701/51 |
| 2007/0256481 | A1* | 11/2007 | Nishiyama et al. ............ 73/113 |
| 2010/0256848 | A1* | 10/2010 | Sasaki et al. ................... 701/22 |
| 2010/0262408 | A1* | 10/2010 | Taguchi et al. .................. 703/8 |
| 2011/0015037 | A1* | 1/2011 | Koenig ......................... 477/121 |
| 2011/0307122 | A1* | 12/2011 | Kanning et al. ................. 701/1 |

FOREIGN PATENT DOCUMENTS

| EP | 0573619 A1 | 12/1993 |
| WO | 2011050880 A1 | 5/2011 |
| WO | 2012161815 A1 | 11/2012 |

* cited by examiner

*Primary Examiner* — Jason Holloway
(74) *Attorney, Agent, or Firm* — Frank A. MacKenzie; Price Heneveld LLP

(57) ABSTRACT

A method of signaling an operator of a motor vehicle to optimize stopping distance including determining a vehicle speed, and determining a preferred time to stop based, at least in part, on the vehicle speed. A maximum acceptable time to stop is determined based, at least in part, on the vehicle speed. A coast rate for the vehicle is determined, and an optimal distance to begin coasting is also determined. The method further includes providing a signal to an operator of the vehicle to begin coasting when the vehicle is at the optimal distance.

9 Claims, 4 Drawing Sheets

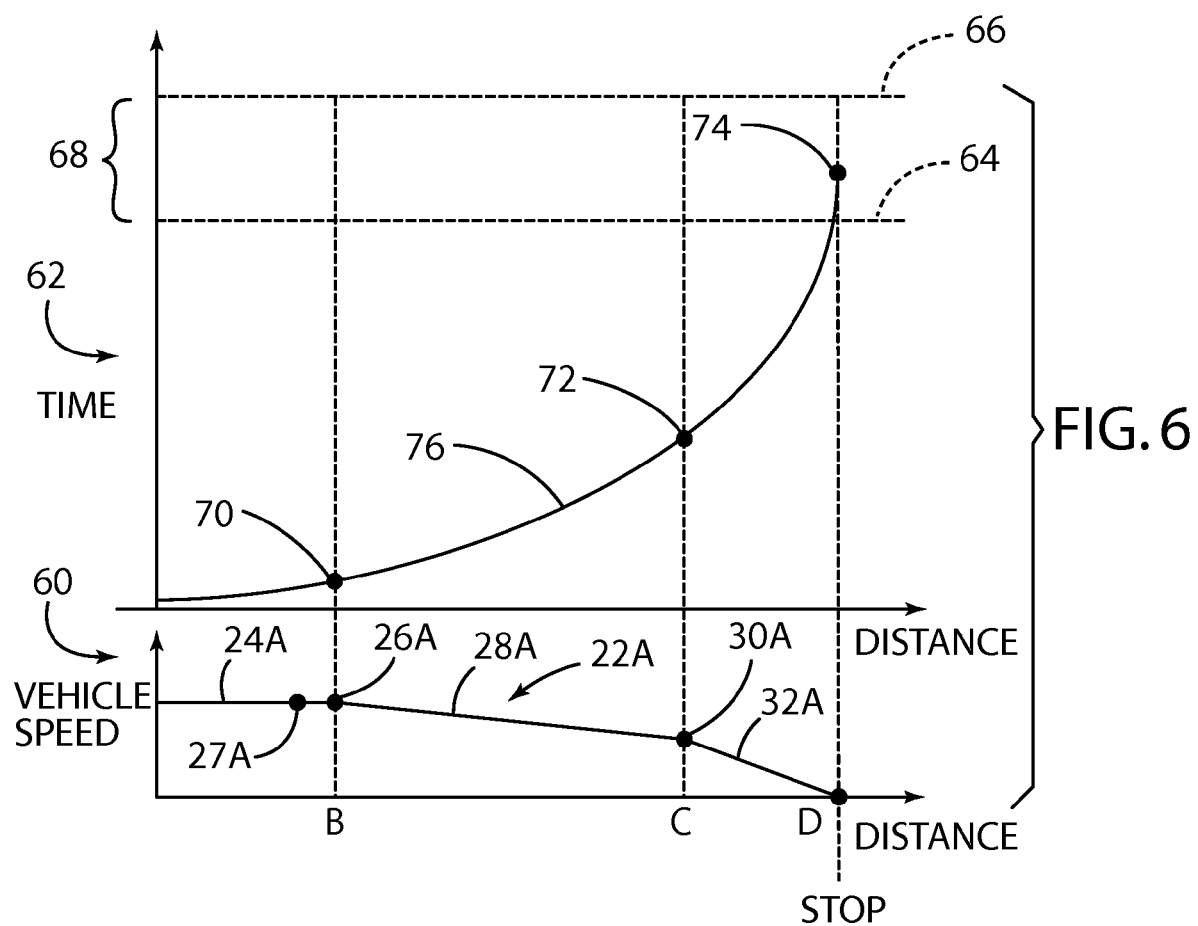

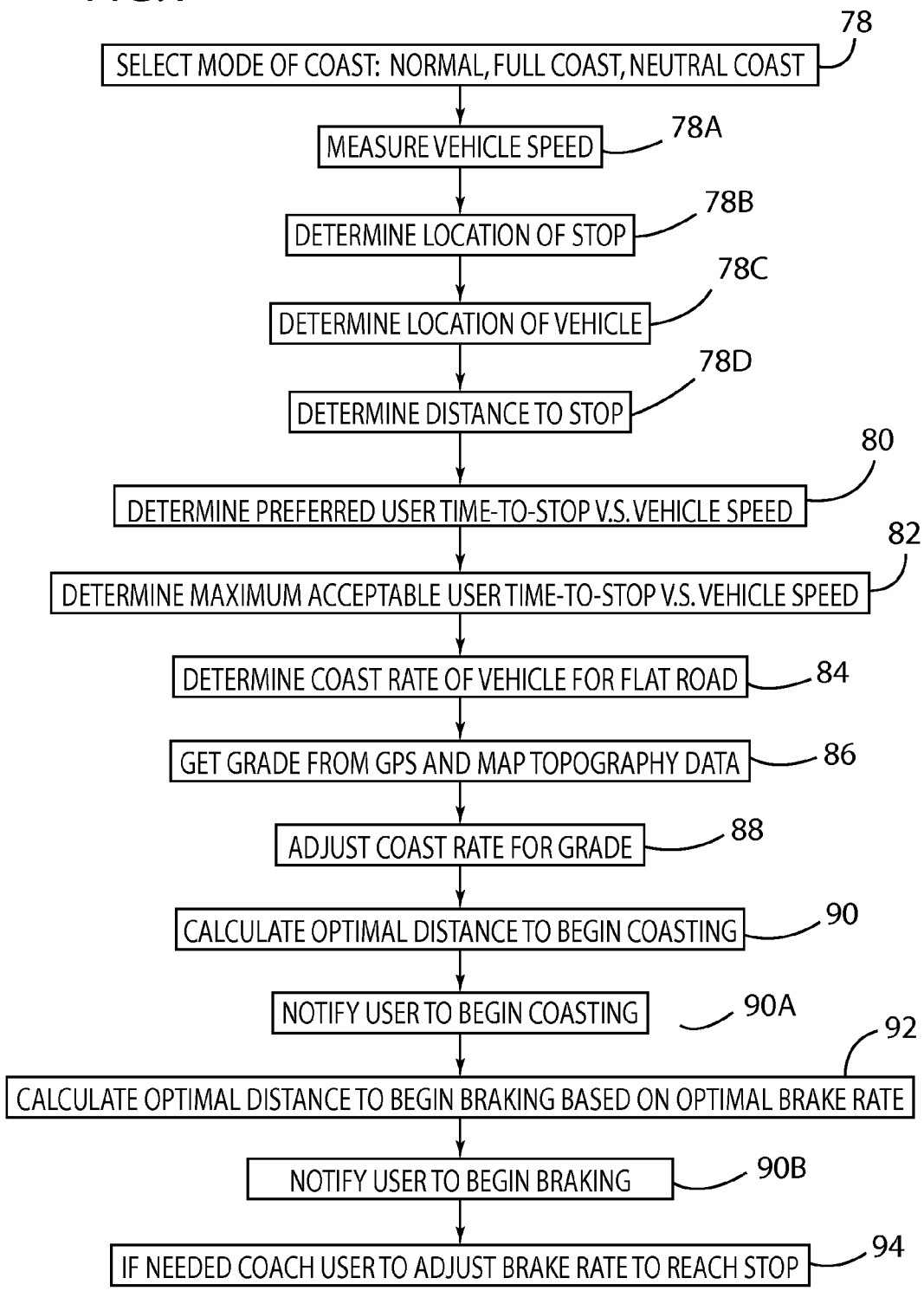

METHOD TO USE GPS TO OPTIMIZE STOPPING DISTANCE TO IMPROVE FUEL ECONOMY

FIELD OF THE INVENTION

The present invention generally relates to motor vehicles, and more particularly, to a system that prompts a vehicle operator to begin coasting as the vehicle approaches a stop.

BACKGROUND OF THE INVENTION

During operation, motor vehicles are often required to stop due to traffic lights, stop signs, traffic, and the like. However, coasting may begin quite late, resulting in reduced fuel efficiency and increased braking.

SUMMARY OF THE INVENTION

One aspect of the present invention is a vehicle and a method of signaling an operator (user) of a motor vehicle to optimize stopping distance. The method includes determining a vehicle speed, and determining a preferred time to stop based, at least in part, on the vehicle speed. The method further includes determining a maximum acceptable time to stop based, at least in part, on the vehicle speed. A coast rate for the vehicle is determined, and an optimal distance to begin coasting is also determined. The method further includes providing a signal to an operator of the vehicle to begin coasting. The signal is provided at or prior to the optimal distance.

Stop locations may be determined from information such as GPS history of stopping locations, vehicle camera, or other suitable technologies. The vehicle location relative to the stop may also be determined utilizing these technologies.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6 is a graph showing time and vehicle speed versus distance according to one aspect of the present invention; and FIG. 7 is a flow chart showing a method according to one aspect of the present invention.

DETAILED DESCRIPTION OF THE PREFERRED EMBODIMENTS

Figure 1:
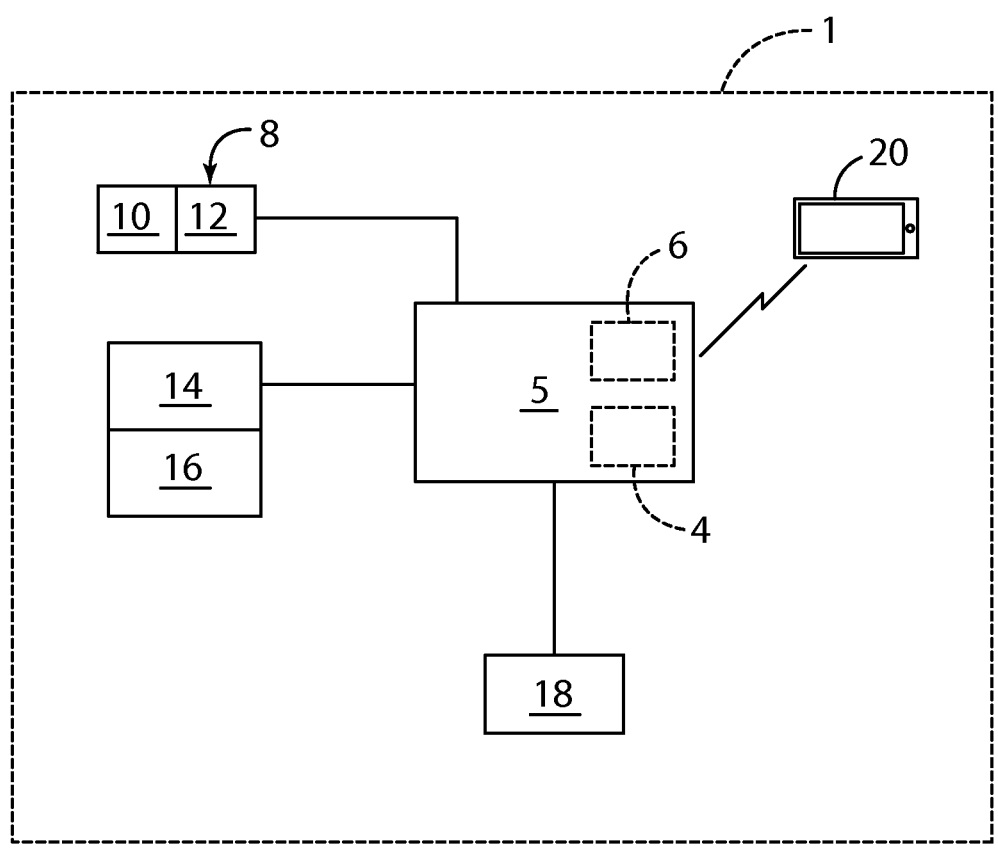
FIG. 1 is a schematic view of a vehicle including various components that may be utilized to implement a method according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 may include an internal combustion engine (not shown) and/or an electrical drive system (not shown). The present invention may be utilized in connection with motor vehicles having conventional internal combustion engines (e.g. gasoline or diesel), and the invention may also be utilized in connection with vehicles having electrical drive systems. Still further, the invention may be utilized in connection with hybrid vehicles having both internal combustion engines and electrical drive features. The invention may be utilized in connection with vehicles that capture energy during braking, including electrical and/or hybrid vehicles that generate electrical power as a result of braking.

In the illustrated example, motor vehicle 1 includes a controller 5 that may be operably connected to a GPS unit 8 having a transmitter 10 and a receiver 12. The vehicle 1 may also include an input device 14 that permits a vehicle operator/user to input information to the controller 5. A display unit 16 may be utilized to provide visual and/or audio signals to a vehicle operator. It will be understood that the control panel 14 may comprise one or more buttons or other input features, or the input device 14 may comprise a touch screen that is integrally formed with the display unit 16. The display unit 16 may comprise an LED or LCD display screen, or it may comprise one or more indicator lights, movable mechanical devices such as a needle pointer, or the like that provide a visual/optical signal to an operator of the vehicle 1. Vehicle 1 may also include a speed sensor 18 that is operably connected to the controller 5. The controller 5 may be configured to communicate with a mobile phone 20 utilizing known wireless communication technology. It will be understood that the controller 5 may comprise one or more individual processors and other components as required for a particular motor vehicle 1.

Controller 5 may be provided with stop locations corresponding to stop signs and/or other known types of road features requiring motor vehicle 1 to stop. The data concerning stop locations may be stored in a memory unit 6 of controller 5. Controller 5 may also include a wireless receiver/transmitter 4 that can be utilized to receive data concerning stop locations from a remote source utilizing known wireless communication systems. The data concerning stop sign locations may comprise GPS data that is determined utilizing known GPS systems or the location could be looked up from web-based map sites or the like. Alternatively, the stop sign location relative to the vehicle could be determined from other suitable technologies such as an onboard camera, onboard radar, or LIDAR (laser-based sensing system).

The GPS unit 8 determines the location of motor vehicle 1, and the data concerning the position of motor vehicle 1 is utilized by controller 5 to determine the distance between motor vehicle 1 and upcoming stop locations. In addition to data concerning stop locations, the controller 5 may also be supplied with GPS data concerning the locations of roads, parking lots, and other route information. Utilizing position and/or velocity data from GPS unit 8 and/or speed sensor 18, controller 5 determines the closest stop location that is likely to be encountered by the motor vehicle 1.

As discussed in more detail below, controller 5 is configured to determine an optimal distance from an upcoming stop to begin coasting, and controller 5 causes the display unit 16 (or other audio or visual indicator) to signal an operator to begin coasting when the vehicle 1 is at a location corresponding to the optimal distance (or time) to begin coasting. Because there may be some time delay between when a "coast" signal is generated/displayed and when the operator begins coasting, the controller 5 may be configured to cause display unit 16 to generate a visual and/or audio signal shortly before the vehicle reaches the optimal distance to begin coasting. For example, if a vehicle is travelling at 45 MPH (66 feet per second), and the operator delay is 0.50 seconds, controller 5 may be configured to provide the operator with a "coast" alert 33 feet before motor vehicle 1 reaches the optimal distance to begin coasting. It will be understood that the controller 5 may measure a plurality of time delays between a "coast" alert and the time a given operator begins coasting to thereby generate an average or expected delay for a specific motor vehicle operator. Alternatively, controller 5 may be configured to provide an earlier signal based on test data involving numerous motor vehicle operators or other predefined criteria.

In general, determining the optimal distance to begin coasting involves balancing or compromising between early coasting which maximizes fuel efficiency but requires more time, versus late coasting which reduces the time required to stop, but typically results in additional energy (e.g. fuel) consumption.

Figure 2:
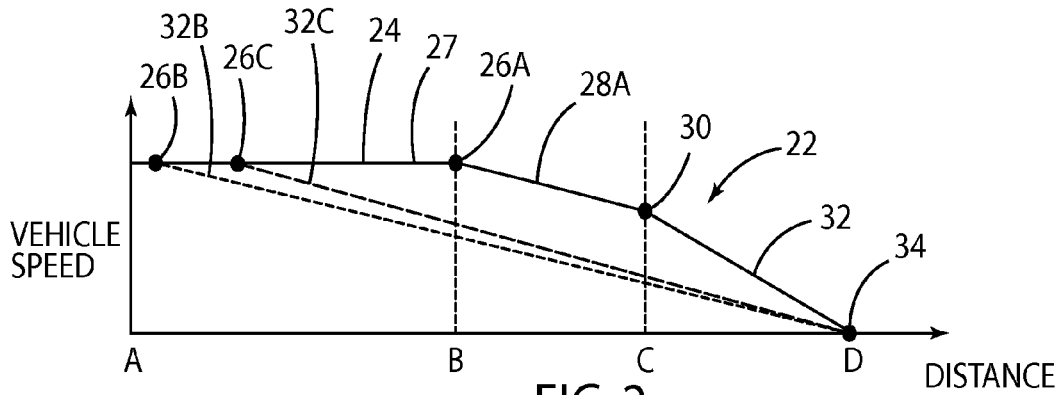
FIG. 2 is a graph of vehicle speed versus distance for an optimal solution according to one aspect of the present invention.

With reference to FIG. 2, an optimum coasting and braking profile 22 can be illustrated as vehicle speed at specific distances from a stop point "D." Initially, the vehicle is travelling at a relatively constant speed as shown by the line segment 24 between distances "A" and "B." At an operator reaction time (example 2 seconds) prior to tip-out point 26 corresponding to distance B the system notifies the operator to coast so that the vehicle operator takes his or her foot off the accelerator pedal, and the motor vehicle begins to coast as shown by the line segment 28A. It will be understood that the motor vehicle 1 may include a conventional accelerator pedal, or it may include other driver input features that permit an operator to control the vehicle speed and acceleration. The tip-out point 26 corresponds to the point at which the vehicle operator causes the vehicle to begin to coast utilizing the operator input feature of the particular vehicle being used.

At an operator reaction time (example 2 seconds) prior to distance "C" corresponding to point 30, the system notifies the operator to brake, so that the vehicle operator causes the vehicle to brake, thereby deaccelerating the vehicle as shown by the line segment 32 until the vehicle comes to a stop at the point 34 corresponding to a distance "D."

The controller 5 may be configured to enable a user to select from various operating modes. For example, line segment 28A of FIG. 2 may comprise a NORMAL COAST mode. In the NORMAL COAST mode, the transmission remains in a DRIVE ("D") control configuration if vehicle 1 includes an automatic transmission having P R N D L or similar such control inputs for an automatic transmission, and the user begins braking at point 30 as described above. Controller 5 may also be configured to provide a NEUTRAL COAST mode corresponding to the dashed line 32B, and a FULL COAST mode corresponding to the dashed line 32C in addition to the NORMAL COAST mode. In the NEUTRAL COAST mode, the transmission is placed in a NEUTRAL operating mode corresponding to an "N" input/position of the shift lever, and the operator allows the vehicle 1 to coast to a stop without any braking. In the FULL COAST mode, the transmission is placed or left in DRIVE (typically corresponding to a "D" position of a shift lever for an automatic transmission), and the vehicle is allowed to coast to a stop without any braking. Selection of a coast mode causes controller 5 to select an appropriate coast rate (e.g. step 84, FIG. 7) for the transmission operating mode. It will be understood that the NEUTRAL COAST mode and the FULL COAST modes may be utilized by an operator who wishes to coast to a stop without braking, but the operator may still choose to brake and/or provide additional power from the vehicle's engine/power source if needed. In operation, a user selects NORMAL COAST mode, NEUTRAL COAST mode, or FULL COAST mode, and controller 5 alerts the operator to begin coasting at one of the points 26A, 26B, or 26C, and the operator will then lift his/her foot off the accelerator pedal and shift the transmission as/if required for the selected operating mode.

The present invention provides a way to more consistently control a vehicle according to an optimum coast and brake profile such as the profile 22 shown in FIG. 2. It will be understood that the optimum profile 22 of FIG. 2 is an example of an optimal profile for a given driver and vehicle at a given stop location, but the optimal profile will typically be different for different vehicles, different operators, and different stop locations and road conditions. The controller 5 (FIG. 1) may be configured to generate a signal to the operator to begin coasting at the point 26 corresponding to the distance B. Alternatively, the controller 5 may be configured to provide an alert to the vehicle operator at a point 27 that is slightly before the tip out point 26 to compensate for driver delay. Controller 5 may, optionally, be configured to provide a "brake" signal to an operator when the vehicle is at the brake point 30 corresponding to the distance C. The "brake" signal is optional because drivers may, on their own, observe the stop sign or other stop location and begin braking to slow the vehicle down.

In general, the controller 5 and display unit 16 may be configured to provide a visual "coast" signal such as the words "BEGIN COASTING" and/or an arrow that points downwardly and/or audio signals such as a bell or voice command such as "begin coasting, stop ahead." Visual signals such as the word "brake" and/or audio signals such as "begin braking, stop ahead" may optionally be provided at the point 30 corresponding to the distance C of FIG. 2.

Figure 3:
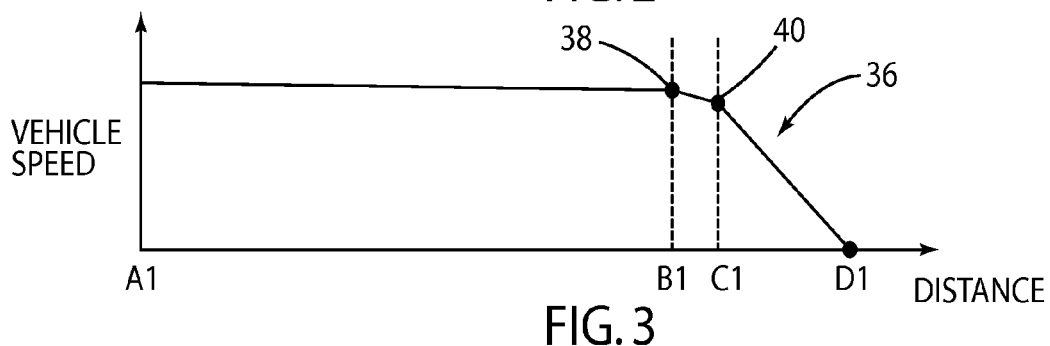
FIG. 3 is a graph showing vehicle speed versus distance in which an operator has started to coast too late relative to an optimal solution.
Figure 4:
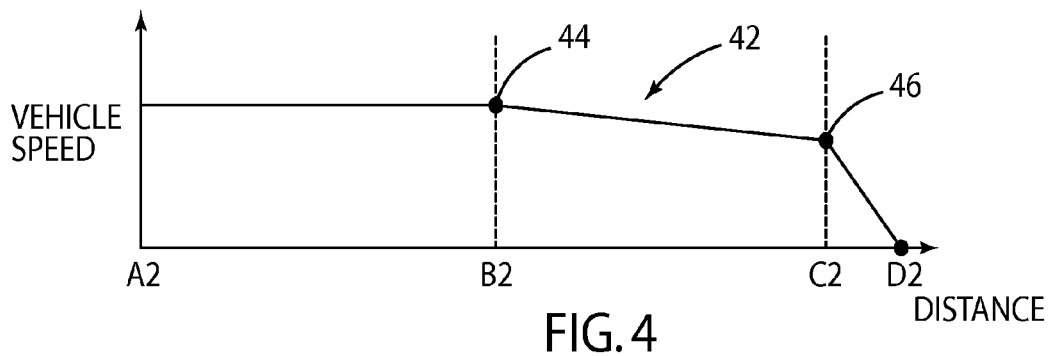
FIG. 4 is a graph showing vehicle speed versus distance in which an operator has started to brake too late relative to an optimal solution.
Figure 5:
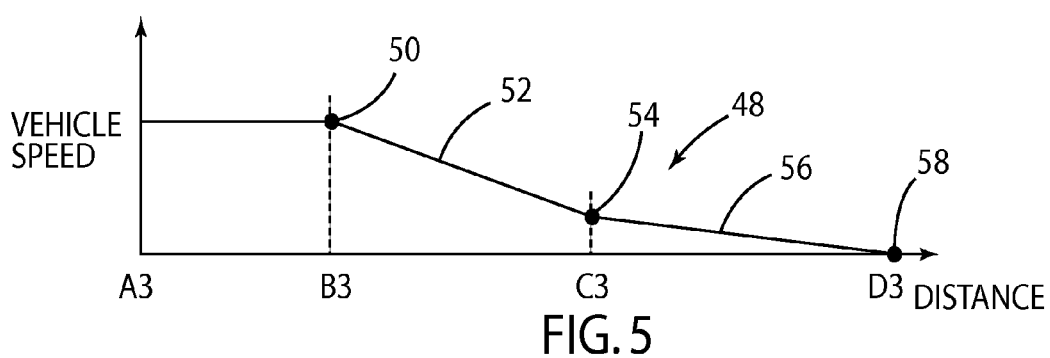
FIG. 5 is a graph of vehicle speed versus distance in which an operator has started to coast too soon.

As discussed above, the coast and brake profile 22 of FIG. 2 is an example of an optimum solution providing a balance or compromise between saving fuel versus decreased total stop time. FIGS. 3-5 are examples of non-optimal coast and brake profiles that may be avoided utilizing a method according to the present invention. For example, the profile 36 of FIG. 3 represents a suboptimal profile in which coasting begins at point 38 corresponding to a distance "B1," followed closely by vehicle braking at point 40 corresponding to distance "C1." The profile 36 of FIG. 3 represents a late coasting scenario which results in increased fuel consumption relative to the optimal profile of FIG. 2. In FIG. 4, profile 42 includes a point 44 corresponding to distance "B2" at which coasting begins. The operator begins braking at point 46 corresponding to distance "C2." The profile 42 represents a late braking scenario which requires rapid deacceleration with high braking. The rapid deacceleration may be uncomfortable to those in the vehicle, and the high braking may also inhibit or prevent power capture if vehicle 1 is an electric or hybrid vehicle that generates electricity during braking. The profile 48 of FIG. 5 includes a point 50 at which the vehicle begins to coast. The point 50 corresponds to a distance "B3." However, in the example of FIG. 5 the vehicle deaccelerates along the line 52 at a rate that does not allow the vehicle to reach the stop corresponding to the distance "D3." Thus, the vehicle operator must "tip-in" at a point 54 corresponding to a distance "C3" to provide additional power along the line segment 56 to enable the vehicle to reach the stop point 58 at distance D3. The profile 48 of FIG. 5 is suboptimal because additional time is required. Furthermore, the profile 48 may also result in increased fuel consumption relative to an optimal profile 22 (FIG. 2).

FIG. 6 includes a first graph 60 showing vehicle speed versus distance, with an optimum coast and brake profile 22A that is generally similar to the optimum profile 22 described in more detail above in connection with FIG. 2. FIG. 6 also includes a second graph 62 showing time versus distance for a vehicle that is slowing down and stopping according to the profile 22A. As discussed in more detail below, a method according to the present invention may include determining a preferred stop point comprising a time and/or stop distance of a user/operator. An example of a preferred stop time is shown as dashed line 64 of FIG. 6. The preferred stop time is determined from operator data that corresponds with a typically acceptable time to the operator. This may comprise measured and recorded data for a specific user or it may comprise data measured for a plurality of operators that is averaged or otherwise combined to provide a predicted preferred stop time. Alternatively, stop distance data may also be utilized to determine a preferred stop distance. In general, the preferred point at which coasting is to begin can be expressed as either a preferred stop time or a preferred stop distance. A maximum acceptable time to stop is also determined as shown by the line 66. The maximum time is determined from operator data that corresponds with the maximum time (or distance) of a stop that is minimally acceptable to the operator. The time interval or range 68 between the preferred and acceptable stop times is then utilized to determine an optimal coasting distance "B" and an optimal braking distance "C." In the time versus distance graph 62, the vehicle will follow the line 76, and the vehicle will begin to coast at the point 70. Braking begins at point 72, and the vehicle stops at point 74.

A method according to the present invention will now be described in more detail in connection with FIG. 7. At step 78, an operator (optionally) selects a NORMAL COAST mode, a FULL COAST mode, or a NEUTRAL COAST mode. This may be done utilizing input device 14, and it may occur while the vehicle is in operation between stops as at step 78A. The speed of the vehicle is measured utilizing speed sensor 18 and/or GPS unit 8 (FIG. 1). In general, steps 78 or 78A of FIG. 7 correspond to vehicle operation prior to coasting or braking as shown by the line segment 24 (FIG. 2) and the line segment 24A (FIG. 6). Thus, in addition to measuring vehicle speed at step 78A, the controller 5 also determines stop locations at step 78B, determines the location of vehicle at step 78C, and determines a distance to a stop at step 78D. The steps 78A, 78B, 78C, and 78D may be executed continuously while the vehicle is in motion. Controller 5 compares the present position of the vehicle to stop locations in the database to determine if the vehicle 1 is approaching a stop location. As discussed above, the controller 5 may be configured to determine vehicle speed and direction to determine if the vehicle 1 is approaching a known stop location. Controller 5 may be configured to continuously determine vehicle speed and location, and determine if the vehicle is approaching a stop.

If the controller 5 determines that the vehicle 1 is approaching a known stop location, the controller looks up a preferred user time-to-stop versus vehicle speed at step 80 (FIG. 7). The preferred user time to stop for a given vehicle speed may be determined utilizing various suitable methods. For example, a given vehicle will generally be capable of a maximum braking rate, corresponding to a minimum possible time-to-stop for a given vehicle. This vehicle minimum time-to-stop may vary depending on the road conditions (e.g. dry, wet, loose gravel, etc.) and the slope of the terrain. Conversely, a given vehicle will normally have a maximum possible time-to-stop corresponding to a distance at which the vehicle will coast to a stop at the stop location (e.g. distance D, FIG. 2). At the maximum possible time-to-stop for a given vehicle and vehicle speed a vehicle would coast to a stop without any vehicle braking. Thus, the controller 5 may be configured to determine a minimum possible time-to-stop and a maximum time-to-stop for a given measured vehicle speed as the vehicle 1 approaches a particular stop location. The minimum time-to-stop and maximum time-to-stop for a given vehicle can be determined empirically, and the data can be stored in a look-up table. Controller 5 may be configured to retrieve the data and interpolate as required to provide minimum and maximum possible time-to-stop values for a given vehicle speed at a given stop location, taking into account road conditions, slope of the road, and other such factors.

The user input device 14 and display unit 16 (FIG. 1) can be configured to provide operator input to permit an operator to select a preferred time-to-stop. For example, an operator may be prompted to select from a range of values corresponding to relatively high fuel efficiency and longer stop times (i.e. close to the maximum possible time-to-stop values) at one end of the spectrum, to a preferred time-to-stop having increased fuel consumption and reduced time-to-stop (i.e. close to the minimum possible time-to-stop values). The operator can input the preferred time-to-stop utilizing input device 14 and/or display unit 16. In this way, an operator can provide a predefined preferred time-to-stop. The controller 5 may also have a default preferred user time-to-stop. The default may be determined empirically by measuring/observing the preferred time-to-stop of vehicle operators. Also, as discussed above, the operator may select from pre-defined modes, such as NORMAL COAST (e.g. line 28A; FIG. 2) NEUTRAL COAST (e.g. line 32B; FIG. 2) or FULL COAST (e.g. line 32C; FIG. 2). Also, controller 5 may be configured to measure the actual time-to-stop times of an operator (e.g. the distances B and C of FIG. 2 in operation), and these previously measured, and stored, time-to-stop profiles can be utilized by controller 5 to predict preferred operator time-to-stop values as a function of vehicle speed.

Referring again to FIG. 7, at step 82 a maximum acceptable operator time-to-stop for a given vehicle speed is retrieved from a database. The maximum acceptable operator time-to-stop may be entered by an operator utilizing input device 14 and/or display unit 16 in response to prompts provided by display unit 16. For example, the operator may be prompted to select a maximum acceptable operator time-to-stop from a range varying from a very short time-to-stop to a very long time-to-stop. It will be understood that the maximum acceptable operator time-to-stop cannot exceed the maximum possible time-to-stop for a given vehicle.

At step 84 (FIG. 7), the coasting rate of the vehicle for a flat road is determined by looking up empirically determined values from a database. In general, the coast rate is the deacceleration of a coasting vehicle on a flat road as a function of the vehicle speed. The coasting rate may also vary depending on whether or not the vehicle transmission is (or will be) in "D" or "N" corresponding to the NORMAL COAST, NEUTRAL COAST, and FULL COAST modes.

At step 86, the controller 5 determines the grade of the road or route utilizing GPS data, and the controller 5 adjusts the coast rate depending on the grade at step 88. It will be understood that the grade data may include the slope and/or elevation of the road at numerous points along the projected vehicle path from the current position of the vehicle to the upcoming stop location, and the coast rate may therefore vary as a function of both vehicle speed and vehicle location.

At step 90, the controller 5 calculates the optimal distance to begin coasting, and generates a signal to the operator to begin coasting. An example of the optimal distance is the distance between distances B and D in FIG. 2. If the operator has selected the NEUTRAL COAST mode or the FULL COAST mode, the optimal distance will correspond to the distances from points 26B or 26C, respectively, to the point D in FIG. 2. In general, the optimal distance may be calculated utilizing the preferred operator time-to-stop values that were previously established for a given vehicle operator. It will be understood that the controller 5 may store preferred operator time-to-stop data for a plurality of operators, and an operator can select a specific preferred time-to-stop utilizing input device 14 and/or display unit 16. At step 90A, the operator/user is notified to begin coasting utilizing an appropriate signal as discussed above.

At step 92 (FIG. 7), the optimal distance to begin braking is determined based on the optimal brake rate. An example of an optimal distance is the distance between the points C and D of FIG. 2. The controller 5 may, optionally, generate an audio or visual signal to the operator at step 92A indicating that braking should begin. At step 94 (FIG. 7), controller 5 may monitor the deacceleration/braking rate of the vehicle and provide a signal to the operator indicating that the proper amount of brake is being applied, or that less or more braking is required. For example, if the optimum profile 22 of FIG. 2 is being implemented, the controller 5 may be configured to continuously monitor the actual braking rate, and compare the measured braking rate (deacceleration) to the optimum braking rate represented by the line segment 32. Controller 5 may generate a signal to the operator to brake harder if the measured braking rate comprises a point that is above the line 32, and controller 5 may generate a signal to the operator to reduce the braking rate if the measured braking rate comprises a point that falls below the optimum line 32.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A GPS-based method of signaling an operator of a motor vehicle having a GPS unit to optimize stopping distance, the method comprising:
   determining a vehicle speed;
   determining a stop location;
   determining a vehicle location using the GPS unit of the vehicle;
   determining a preferred stopping parameter, wherein the preferred stopping parameter comprises at least one of a preferred time to stop and a preferred distance to stop based, at least in part, on the vehicle speed;
   determining a maximum acceptable time and/or distance to stop based, at least in part, on the vehicle speed;
   determining the coast rate for the vehicle;
   determining an optimal distance from the stop location to begin coasting;
   providing a signal to an operator of the vehicle to begin coasting, wherein the signal is provided to an operator when the vehicle is at or prior to the optimal distance to begin coasting;
   utilizing an operator input to determine at least one of a preferred time to stop and a preferred distance to stop,
   prompting an operator to input at least one of a preferred time to stop and a preferred distance to stop,
   providing an operator with a plurality of inputs comprising time to stop inputs and/or preferred distance to stop inputs;
   prompting an operator to select at least one of the time to stop inputs and/or at least one of the preferred distance to stop inputs,
   wherein the plurality of inputs comprise time to stop inputs including a range of time to stop inputs bounded by a minimum time to stop input and a maximum time to stop input.

2. The method of claim 1, including:
   providing an operator with fuel consumption information corresponding to the plurality of inputs.

3. The method of claim 1, wherein:
   determining the coast rate for the vehicle includes retrieving coast rate data utilizing the vehicle speed.

4. The method of claim 1, wherein:
   the optimal distance is determined based, at least in part, on at least one of the preferred time to stop and the preferred distance to stop.

5. The method of claim 1, including:
   determining an optimal distance from the stop location to begin braking.

6. The method of claim 5, including:
   providing a signal to an operator of the vehicle to begin braking.

7. The method of claim 1, wherein:
   the signal comprises at least one of a visual indicator and a noise.

8. A GPS-based method of signaling an operator of a motor vehicle having a GPS unit to optimize stopping distance, the method comprising:
   determining a vehicle speed;
   determining a stop location;
   determining a vehicle location using the GPS units of the vehicle;
   determining a preferred stopping parameter, wherein the preferred stopping parameter comprises at least one of a preferred time to stop and a preferred distance to stop based, at least in part, on the vehicle speed;
   determining a maximum acceptable time and/or distance to stop based, at least in part, on the vehicle speed;
   determining the coast rate for the vehicle;
   determining an optimal distance from the stop location to begin coasting;
   providing a signal to an operator of the vehicle to begin coasting, wherein the signal is provided to an operator when the vehicle is at or prior to the optimal distance to begin coasting,
   providing a NORMAL COAST mode of operation corresponding to coasting with a vehicle's automatic transmission in DRIVE followed by braking to stop the vehicle at the stop location;
   providing a NEUTRAL COAST mode of operation corresponding to coasting with an automatic transmission in NEUTRAL and wherein the vehicle coasts to a stop at the stop location without braking;

providing a FULL COAST mode of operation corresponding to coasting with an automatic transmission in NEUTRAL and wherein the vehicle coasts to a stop at the stop location without braking;

providing an operator with an input feature enabling the operator to select one of the NORMAL COAST, NEUTRAL COAST, and FULL COAST modes; and utilizing an operator mode selection to determine the coast rate for the vehicle to determine when to provide the operator with a signal to begin coasting.

9. The method of claim 1, including:

measuring a plurality of vehicle speeds and corresponding distances at which an operator begins to coast when approaching a stop; and utilizing the measured vehicle speeds and corresponding distances to determine at least one of a preferred time to stop and a preferred distance to stop.

* * * * *